US011035502B2

(12) United States Patent
DeHart

(10) Patent No.: US 11,035,502 B2
(45) Date of Patent: Jun. 15, 2021

(54) COMPRESSION RESISTANT THREADED CONNECTION

(71) Applicant: Marubeni-Itochu Tubulars America Inc., Houston, TX (US)

(72) Inventor: Cody Allen DeHart, Cypress, TX (US)

(73) Assignee: MARUBENI-ITOCHU TUBULARS AMERICA INC., Houston, TX (US)

( * ) Notice: Subject to any disclaimer, the term of this patent is extended or adjusted under 35 U.S.C. 154(b) by 313 days.

(21) Appl. No.: 15/997,064

(22) Filed: Jun. 4, 2018

(65) Prior Publication Data

US 2018/0356014 A1 Dec. 13, 2018

Related U.S. Application Data

(60) Provisional application No. 62/516,466, filed on Jun. 7, 2017.

(51) Int. Cl.
*E21B 17/042* (2006.01)
*F16L 15/06* (2006.01)
*F16L 15/00* (2006.01)

(52) U.S. Cl.
CPC ............ *F16L 15/06* (2013.01); *E21B 17/042* (2013.01); *F16L 15/004* (2013.01); *F16L 15/003* (2013.01)

(58) Field of Classification Search
None
See application file for complete search history.

(56) References Cited

U.S. PATENT DOCUMENTS

| 6,254,146 | B1* | 7/2001 | Church | E21B 17/042 |
| | | | | 285/334 |
| 6,485,063 | B1* | 11/2002 | Olivier | E21B 17/042 |
| | | | | 285/333 |
| 6,581,980 | B1* | 6/2003 | DeLange | E21B 17/042 |
| | | | | 285/334 |
| 6,755,447 | B2 | 6/2004 | Galle, Jr. et al. | |
| 8,136,846 | B2* | 3/2012 | Church | E21B 17/042 |
| | | | | 285/334 |
| 8,146,959 | B2 | 4/2012 | Roussie | |
| 8,668,232 | B2 | 3/2014 | Mazzaferro et al. | |
| 9,970,576 | B2* | 5/2018 | Williamson | E21B 17/042 |
| 2015/0167869 | A1 | 6/2015 | Dehart | |

OTHER PUBLICATIONS

The International Search Report and Written Opinion for related PCT application PCT/US2018/036405 dated Sep. 26, 2018.

* cited by examiner

*Primary Examiner* — Matthew Troutman
*Assistant Examiner* — Douglas S Wood
(74) *Attorney, Agent, or Firm* — Bracewell LLP; Constance G. Rhebergen; Kevin R. Tamm

(57) ABSTRACT

A threaded connection having a straight central axis, where the pin threads and the box threads are arranged such that when the connection is fully made up, the pin roots and box crests come into at least partial interference substantially in line with a pin root taper plane and a box crest taper plane, and wherein the angles of the pin root taper plane and box crest taper plane allow for reduction of axial compressive forces on the plurality of pin threads and plurality of box threads along the central axis.

14 Claims, 11 Drawing Sheets

COMPRESSION RESISTANT THREADED CONNECTION

PRIORITY

The present application is a non-provisional application of and claims priority to and the benefit of U.S. Prov. App. Ser. No. 62/516,466, filed Jun. 7, 2017, the entire disclosure of which is hereby incorporated by reference in its entirety.

FIELD

The present technology relates to threaded connections for pipes, and in particular to threaded connections for pipes that carry oil and gas and that have an increased ability to withstand stress forces, particularly compressive stress forces.

BACKGROUND

Pipes used, for example, in oilfield pipelines, have been joined end-to-end to transport oil or other fluids from place to place. In some instances, the ends of the pipes are joined by threading together the male ends of pipes, known as a pin, with a separate coupling into which two pins are disposed (known as the box).

There are a number of different types of connections for pipes used in pipelines. Some connections are known as integral flush connections, wherein the connection is machined into the pipe body, without adding any additional material, or up-setting, when joining the two pieces of pipe. The result is a connection having an outer diameter that is flush with the outer diameter of the pipes, and an inner diameter that is flush with the inner diameter of the pipes.

In threaded connections, there is typically a weak point, which is the point where the connection is most likely to fail. Tensile and compressive forces on a pipe coupling during installation, production, and repair can cause connections to fail. Damage from tensile and compressive forces can occur to threads and seals in pipe connections.

SUMMARY

Disclosed herein are threaded connections which can sustain greater compressive forces without damage to components of the connection. Deflection of axial compressive forces radially outwardly can operate to help protect and save sealing surfaces from failure.

In some embodiments, a threaded connection having a straight central axis is disclosed, and the connection includes a pin, the pin comprising a plurality of pin threads, each pin thread having a root, a crest, a stab flank, and a load flank, a depth of each pin thread determined by a distance between the root and the crest, and a width of each pin thread determined by a distance between the stab flank and the load flank; the roots of adjacent pin threads aligned along a pin root taper plane that is angled radially outwardly relative to the straight central axis of the connection from an internal end of the pin to an external end of the pin; and the crests of adjacent pin threads aligned substantially parallel to the straight central axis.

The connection further includes a box, the box having a plurality of box threads, each box thread having a root, a crest, a stab flank, and a load flank, a depth of each box thread determined by a distance between the root and the crest, and a width between each box thread determined by a distance between the stab flank and the load flank of adjacent box threads; a portion of the crests of adjacent box threads aligned along a box crest taper plane that is angled radially outwardly relative to the straight central axis of the connection from a center of the box to an external end of the box; the roots of adjacent box threads aligned substantially parallel to the straight central axis; wherein the pin threads and the box threads are arranged such that when the connection is fully made up, the pin roots and box crests come into at least partial interference substantially in line with the pin root taper plane and box crest taper plane, and wherein the angles of the pin root taper plane and box crest taper plane allow for reduction of axial compressive forces on the plurality of pin threads and plurality of box threads along the straight central axis.

In some embodiments, the pin root taper plane and box crest taper plane are angled radially outwardly toward the external end of the pin at about between 1° and about 6° relative to the straight central axis. In other embodiments, the pin root taper plane and box crest taper plane are angled radially outwardly toward the external end of the pin at about 4° relative to the straight central axis. Still in other embodiments, the threaded connection includes a pin internal seal surface and a box internal seal surface, such that when the connection is fully made up an internal metal-to-metal seal comes into interference. In some embodiments, the pin root taper plane and box crest taper plane are angled radially outwardly toward the external end of the pin at about ±2° relative to an angle of the metal-to-metal seal relative to the straight central axis.

In certain embodiments, stab flank angles of the stab flanks of the pin threads are about positive 9°. In some embodiments, stab flank angles of the stab flanks of the box threads are about positive 9°. In other embodiments, load flank angles of the load flanks of the pin threads are about negative 6°. Still in other embodiments, load flank angles of the load flanks of the box threads are about negative 6°. In some embodiments, upon makeup of the connection, one or more voids suitable for placement of doping exists between at least one location selected from the group consisting of: between the pin crests and box roots, between the stab flanks, and between the pin roots and box crests.

Additionally disclosed is a method for machining a threaded connection having a straight central axis, the method including the steps of machining a pin, the pin comprising a plurality of pin threads, each pin thread having a root, a crest, a stab flank, and a load flank, a depth of each pin thread determined by a distance between the root and the crest, and a width of each pin thread determined by a distance between the stab flank and the load flank; the roots of adjacent pin threads aligned along a pin root taper plane that is angled radially outwardly relative to the straight central axis of the connection from an internal end of the pin to an external end of the pin; and the crests of adjacent pin threads aligned substantially parallel to the straight central axis; and machining a box, the box having a plurality of box threads, each box thread having a root, a crest, a stab flank, and a load flank, a depth of each box thread determined by a distance between the root and the crest, and a width between each box thread determined by a distance between the stab flank and the load flank of adjacent box threads; a portion of the crests of adjacent box threads aligned along a box crest taper plane that is angled radially outwardly relative to the straight central axis of the connection from a center of the box to an external end of the box; the roots of adjacent box threads aligned substantially parallel to the straight central axis; wherein the pin threads and the box threads are arranged such that when the connection is fully made up, the pin roots and box crests come into at least partial interference substantially in line with the pin root taper plane and box crest taper plane, and wherein the angles of the pin root taper plane and box crest taper plane allow for reduction of axial compressive forces on the plurality of pin threads and plurality of box threads along the straight central axis.

In some embodiments of the methods, the pin root taper plane and box crest taper plane are machined to be angled radially outwardly toward the external end of the pin at about between 1° and about 6° relative to the straight central axis. In certain embodiments, the pin root taper plane and box crest taper plane are machined to be angled radially outwardly toward the external end of the pin at about 4° relative to the straight central axis. Still in other embodiments, the method includes a step of machining a pin internal seal surface and a box internal seal surface, such that when the connection is fully made up an internal metal-to-metal seal comes into interference.

In certain embodiments, the pin root taper plane and box crest taper plane are machined to be angled radially outwardly toward the external end of the pin at about ±2° relative to an angle of the metal-to-metal seal relative to the straight central axis. In yet still other embodiments, stab flank angles of the stab flanks of the pin threads are machined to be about positive 9°. In certain embodiments, stab flank angles of the stab flanks of the box threads are machined to be about positive 9°. In other embodiments, load flank angles of the load flanks of the pin threads are machined to be about negative 6°.

In some embodiments of the method, load flank angles of the load flanks of the box threads are machined to be about negative 6°. And still in other embodiments, the method includes the step of machining one or more voids suitable for placement of doping between at least one location selected from the group consisting of: between the pin crests and box roots, between the stab flanks, and between the pin roots and box crests. In other embodiments of the connection and method for making, the negative angle of the load flank can be between about negative 3° and negative 7°, and the positive angle of the stab flank can be between about positive 6° and positive 11°.

BRIEF DESCRIPTION OF THE DRAWINGS

The present technology will be better understood on reading the following detailed description of nonlimiting embodiments thereof, and on examining the accompanying drawings.

DETAILED DESCRIPTION OF THE EXAMPLE EMBODIMENTS

Figure 1:
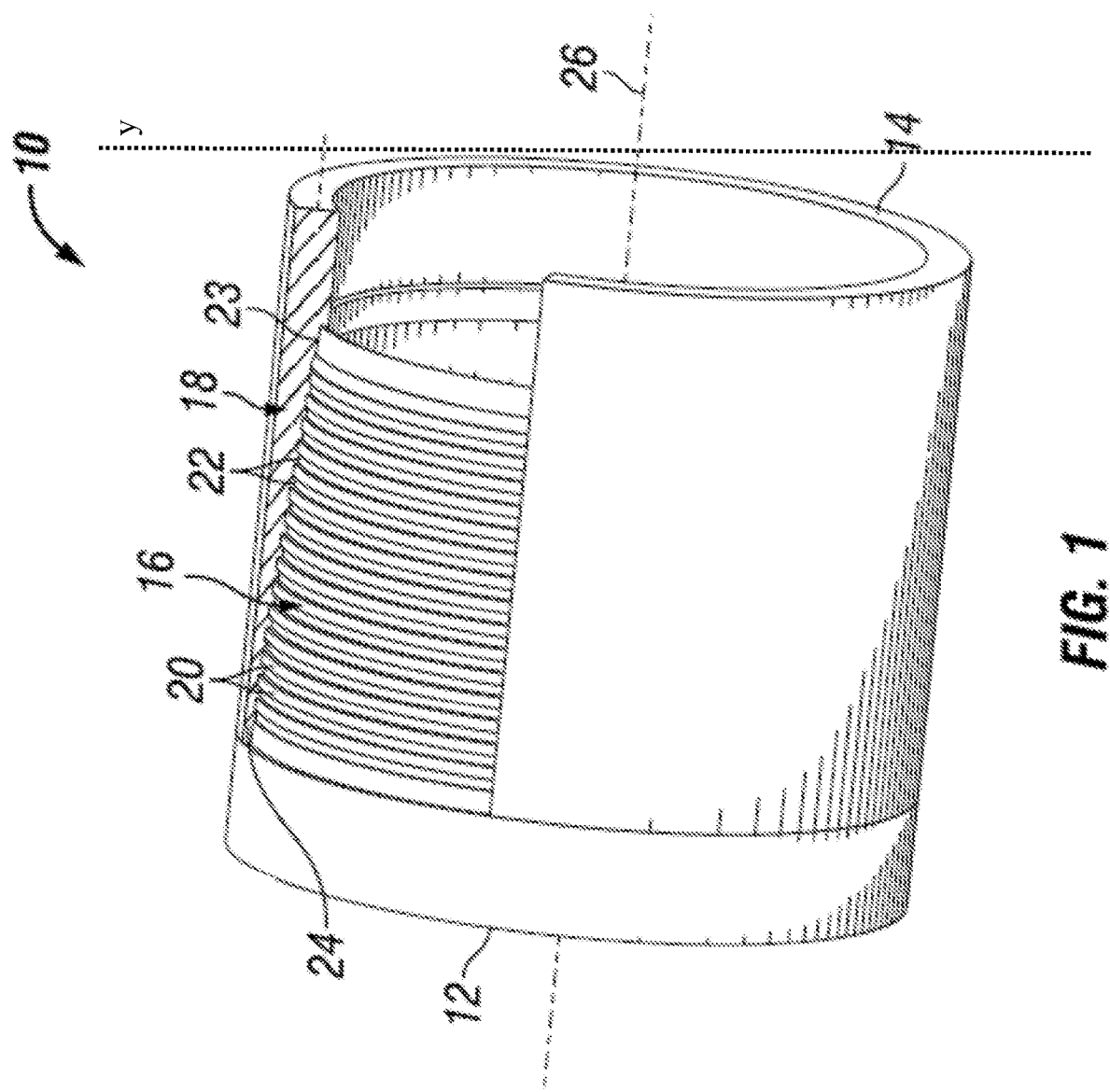
FIG. 1 is a perspective view of one side of a threaded connection according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

Referring first to FIG. 1, a perspective view is shown of one side of a threaded connection according to an embodiment of the present technology. In some embodiments, a similar, second threaded connection would exist opposite mirror plane y and be connected and integral with the pictured threaded connection (for example see FIG. 11). FIG. 1 depicts an isometric perspective view of a threaded connection 10 with a straight central axis 26 perpendicular to the mirror plane y. It should be appreciated that other connection types are possible while still complying with the principles disclosed herein. For example, in some embodiments the connection may be an integral flush connection, a flush connection, semi-flush connection, flush expandable connection, semi-flush expandable connection, or any other appropriate type of connection for use in pipes or pipelines.

The connection 10 of the embodiment of FIG. 1 includes a first tubular member 12 and a pipe coupling member 14. The end portion of the first tubular member 12 is the pin 16, which is the male portion of the connection 10. The end portion of the pipe coupling member 14 is the box 18, which is the female portion of the connection 10. As shown, the pin 16 has pin threads 20 that correspond to box threads 22 such that the pin 16 and the box 18 can be threadingly engaged to make up the connection 10. When the connection 10 is fully made up, optional seal surfaces on the pin 16 and the box 18 interact to form an internal seal 23 and an external seal 24 between the pin 16 and the box 18, thereby preventing fluids, which flow through the first tubular member 12, pipe coupling member 14, and the connection 10, from leaking.

Throughout the description of the embodiments herein, the term "fluids" is meant to include both liquids and gases. It should be appreciated that in at least some embodiments, tubular members may comprise any suitable tubular member for use within both industrial and non-industrial applications. For example, in some embodiments, tubular members comprise a commonly used tubular member in the oil and gas industry, such as, for example, casing pipe, production tubing, or drill pipe.

Figure 2:
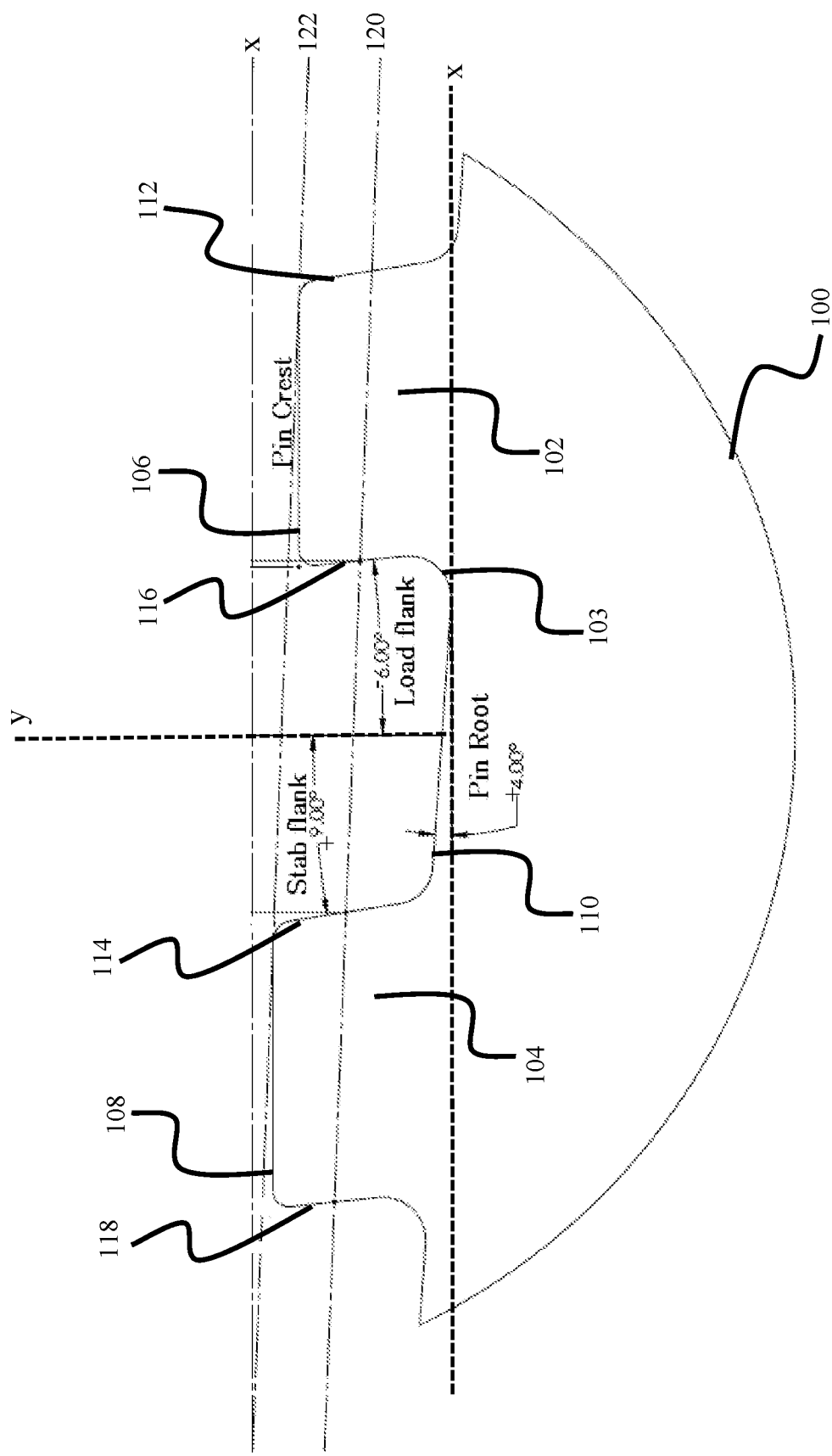
FIG. 2 is a cross-sectional view providing a pin thread profile for a pin on the end of a pipe.

FIG. 2 is a cross-sectional view providing a pin thread profile for a pin on the end of a pipe, for example pin 16 on first tubular member 12 from FIG. 1. Pipe segment 100 includes threads 102, 104, where thread 102 includes pin crest 106, stab flank 112, and load flank 116, and where thread 104 includes pin crest 108, stab flank 114, and load flank 118. Pin root 110 is disposed between and below stab flank 114 and load flank 116. For reference, horizontal axis x is shown, similar to central axis 26 in FIG. 1, and vertical axis y is shown, vertical axis y being perpendicular to horizontal axis x. The pin taper plane is shown by taper lines 120, 122.

As shown in the embodiment of FIG. 2, the rise of the pin root 110 from the load flank 116 to the stab flank 114 radially outwardly is positive 4.00° relative to the horizontal axis x. In other embodiments, the rise of a pin root from a load flank to a stab flank relative to a horizontal axis can be between about 1° to about 6°, between about 2° to about 5°, and between about 3° to about 4°. In embodiments of the present disclosure, one or more pin roots is in a positive angle in reference to a straight, central, horizontal axis, the angle being similar to, but different than, the angle of a pin perfect thread taper.

In the embodiment of FIG. 2, other pin thread features include a negative load flank of negative 6° (less than 90° and extending toward the vertical axis y as shown) for load flank 116, a positive stab flank of 9° (greater than 90° and extending away from the vertical axis y as shown) for stab flank 114, and pin crests 106, 108 being substantially parallel to the horizontal axis x. Pin root 110 proceeds at a positive angle in reference to the pipe axis, 4° radially outwardly in the embodiment shown, generally along taper lines 120 and 122. In other embodiments, the negative angle of the load flank can be between about negative 3° and negative 7°, and the positive angle of the stab flank can be between about positive 6° and positive 11°.

Figure 3:
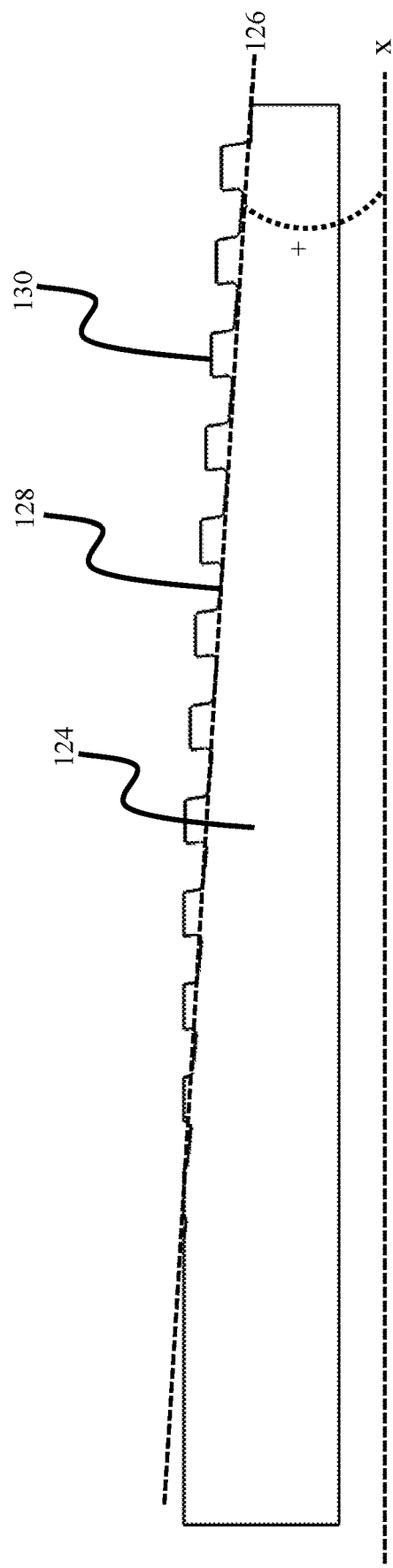
FIG. 3 is a cross-sectional view providing a pin thread profile for a pin on the end of a pipe.

FIG. 3 is a cross-sectional view providing a pin thread profile for a pin on the end of a pipe. Pipe segment 100 of FIG. 2 can represent a portion of pin 124 shown in FIG. 3. As explained with regard to FIG. 2, in FIG. 3 pin root taper 126 can run at a positive angle along pin roots 128 relative to horizontal axis x, for example between about 1° and about 6°, for example about 4°. Pin crests 130 as shown are parallel to horizontal axis x.

Figure 4:
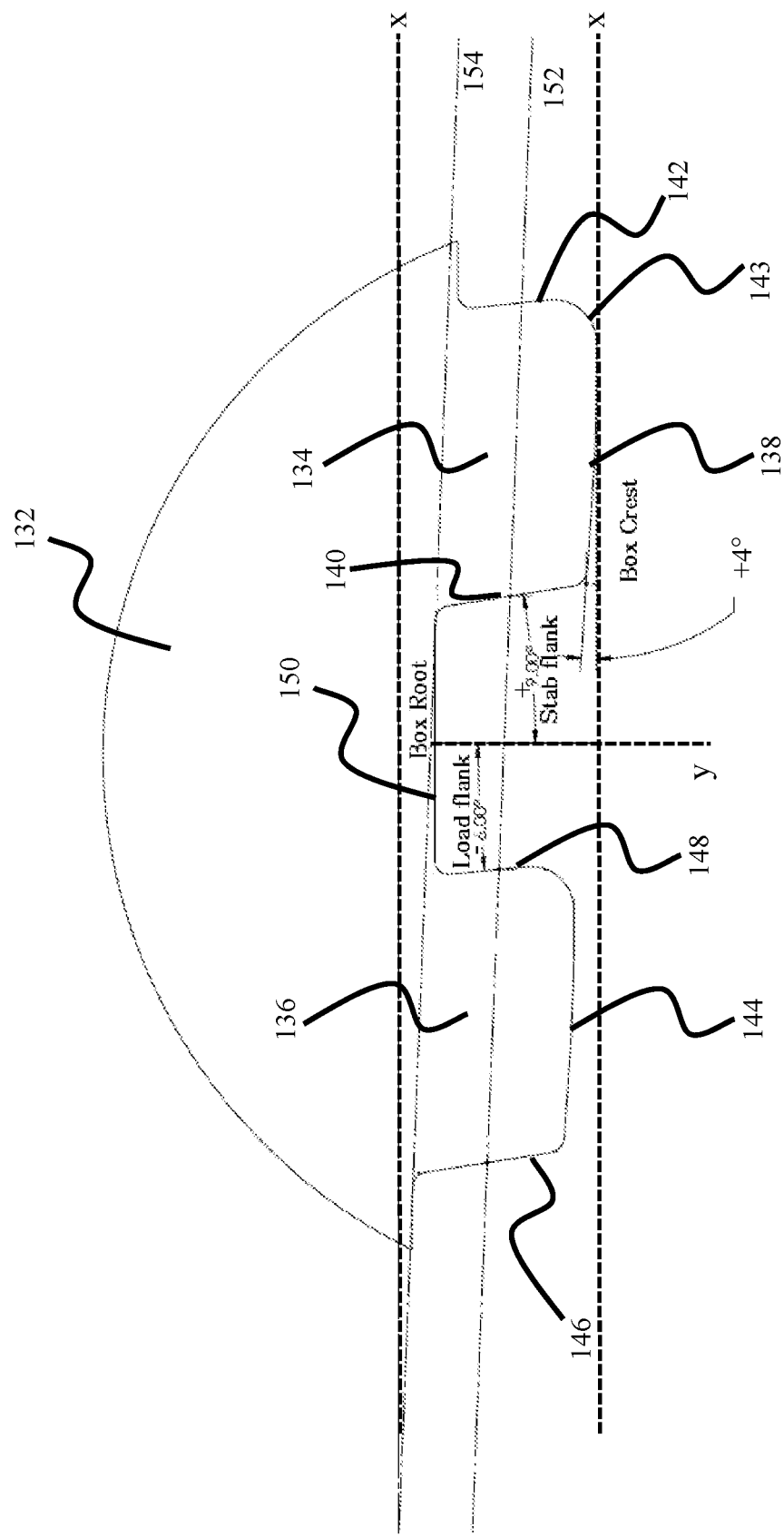
FIG. 4 is a cross-sectional view providing a box thread profile for a coupling used for connecting pipe pins.

Referring now to FIG. 4, a cross-sectional view is shown providing a box thread profile for a coupling for connecting pipe pins on two separate pipes. Coupling segment 132 includes threads 134, 136, where thread 134 includes box crest 138, stab flank 140, and load flank 142, and where thread 136 includes box crest 144, stab flank 146, and load flank 148. Box root 150 is disposed between and below stab flank 140 and load flank 148. For reference, horizontal axis x is shown, similar to central axis 26 in FIG. 1, and vertical axis y is shown, vertical axis y being perpendicular to horizontal axis x The box taper plane is shown by taper lines 152, 154.

As shown in the embodiment of FIG. 4, the rise of the box crest 138 from about the midpoint of the box crest to the stab flank 140 radially outwardly is positive 4.00° relative to the horizontal axis x. From load flank 142 to about the midpoint of box crest 138, box crest 138 is substantially parallel to horizontal axis x. In other embodiments the rise of a box crest from a load flank to a stab flank relative to a horizontal axis, at varying points along the box crest, can be between about 1° to about 6°, between about 2° to about 5°, and between about 3° to about 4°.

In the embodiment of FIG. 4, other box thread features include a negative load flank of 6° (less than 90° and extending toward the vertical axis y as shown) for load flank 148, a positive stab flank of 9° (greater than 90° and extending away from the vertical axis y as shown) for stab flank 140, and box root 150 being parallel to the horizontal axis x. In other embodiments, the negative angle of the load flank can be between about negative 3° and negative 7°, and the positive angle of the stab flank can be between about positive 6° and positive 11°.

A portion of box crests 138, 144 proceed at a positive angle in reference to the pipe axis, radially outwardly positive 4° in the embodiment shown, generally along taper lines 152 and 154. In the embodiments shown, a portion of the box crests from the stab flanks to about the mid-point of the box crests proceed at a positive angle in reference to the pipe axis, 4° in the embodiment shown, and a portion of the box crests from about the mid-point of the box crests to the load flank is substantially parallel to the central axis, horizontal axis x. In other embodiments, other angles can be used, and other portions of the box crests can be angled or substantially parallel to the central axis.

Figure 6:
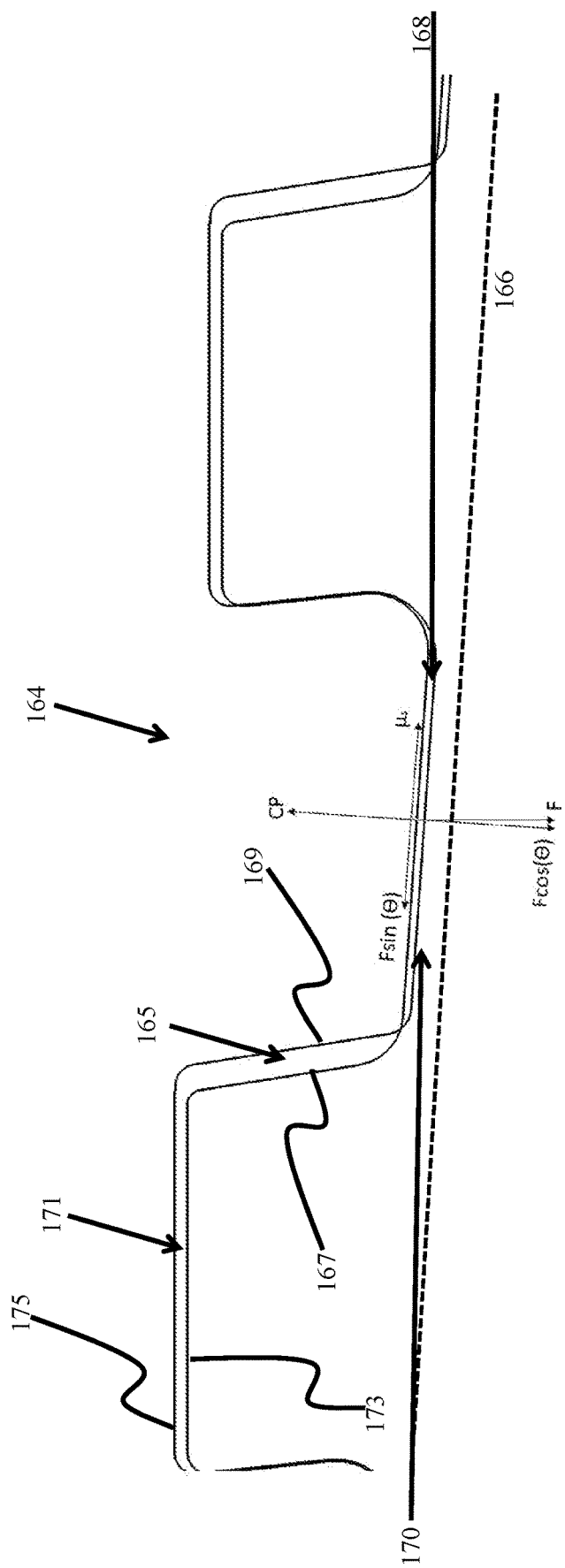
FIG. 6 is a cross-sectional view providing a force analysis during interference of made up pin and box threads in embodiments of the present disclosure.

Similarly, in some embodiments for example a pin root such as pin root 110 in FIG. 2 will align with, threadingly engage with, and/or be in interference with at least a portion of a box crest, such as for example box crest 138 or 144 in FIG. 4, along the entire length of the pin root and box crest, or along a partial length of the pin root and box crest. For example, one or more box crests may not run along an entire length of one or more pin roots to allow space for doping within made up threads. In some embodiments, for example, a box root such as box root 150 in FIG. 4 will not threadingly engage with, and/or be in interference with a pin crest, such as for example pin crest 106 or 108 in FIG. 2, along the entire length of the box root and pin crest, or along a partial length of the box root and pin crest. As shown in FIG. 6, a gap, space, or void 165 exists and is disposed between stab flanks 167, 169, and a gap, space, or void 171 exists and is disposed between pin crest 173 and box root 175. Gaps, spaces, or voids are also shown between the stab flanks and between the pin crests and box roots in FIG. 7.

In other embodiments, for example, a box root such as box root 150 in FIG. 4 will align with, threadingly engage with, and/or be in interference with a pin crest, such as for example pin crest 106 or 108 in FIG. 2, along the entire length of the box root and pin crest, or along a partial length of the box root and pin crest.

Figure 5:
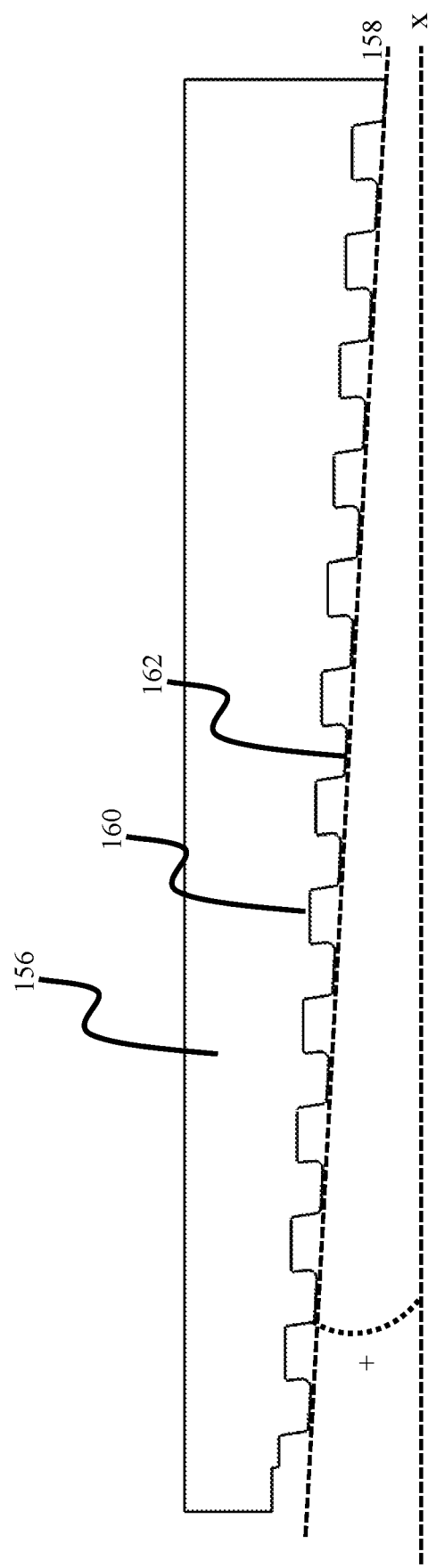
FIG. 5 is a cross-sectional view providing a box thread profile for a coupling used for connecting pipe pins.

FIG. 5 is a cross-sectional view providing a box thread profile for a coupling for connecting pipe pins of two separate pipes. Coupling segment 132 of FIG. 4 can represent a portion of box 156 shown in FIG. 5. As explained with regard to FIG. 4, in FIG. 5 box crest taper 158 can run generally at a positive angle along box crests 162 relative to horizontal axis x, for example between about 1° and about 6°, for example about 4°. Box roots 160 as shown are parallel to horizontal axis x.

Referring now to FIG. 6, a cross-sectional view is shown providing a force analysis during interference of pin and box threads in an embodiment of the present disclosure. Overlap of solid lines in the drawings shows interference between a box and pin in embodiments of the present disclosure. In FIG. 6, F represents the force from the interference of the threads in a made up connection 164. Since the interference is on a taper plane 166, force is broken into components to determine each appropriate force. θ is equal to the pin root and box crest taper angle, for example about 4° in some embodiments. $\mu_s$ is equal to the static friction of the mating surfaces. For the purpose of FIG. 6, the static friction is equal to 1. CP is the actual contact pressure at the surface of contact.

In embodiments of the present disclosure, thread interference will be in the pin root and box crest for premium and semi-premium connections, for example as shown in FIG. 6. The unique geometry allows for higher torque to be stored in the threads without increasing the interference, due to a greater surface area of contact between the pin roots and box crests. Still referring to FIG. 6, made up pipe connections such as made up connection 164 can undergo compressive axial forces 168, 170 during installation, use, and repair. When made up connection 164 is angled at θ, a certain amount of compressive axial forces 168, 170 are deflected in the radial direction reducing compression on at least the load flanks of the connection, and other sensitive areas such as seals.

Figure 7:
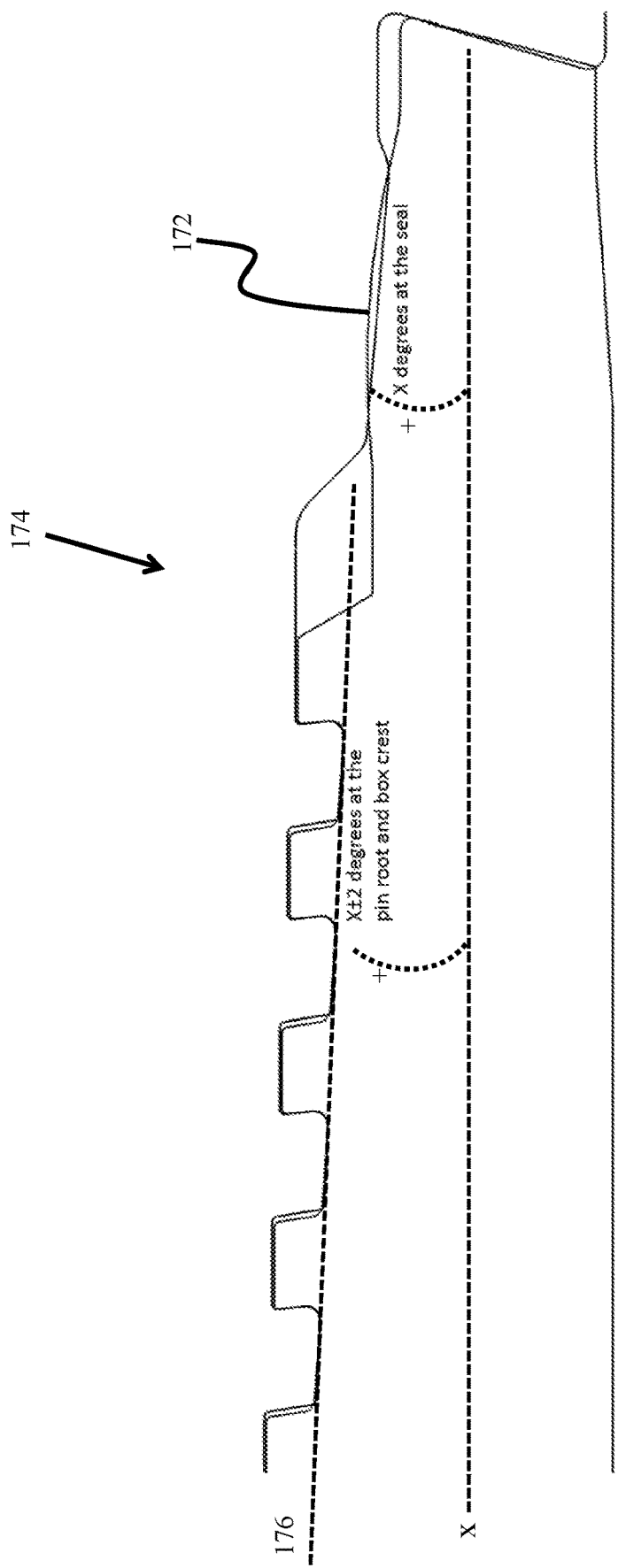
FIG. 7 is a cross-sectional view showing an internal seal under interference and related pin and box threads under interference.

Referring now to FIG. 7, a cross-sectional view is shown providing a connection with an internal seal under interference and related pin and box threads under interference. A metal-to-metal, made up internal seal 172 on a connection 174 is disposed at a positive angle x° relative to the horizontal axis x. In some embodiments, the angle of the pin root and box crest along thread taper 176 will be x°±2° of the box seal angle (x°) of the metal-to-metal, made up internal seal 172. The box seal angle x° will be a radially outward positive angle proceeding from the internal seal toward an external end of the pin between about 1° to about 20°, in some embodiments between about 2° to about 10°, and in some embodiments between about 1° to about 5°.

Figure 8:
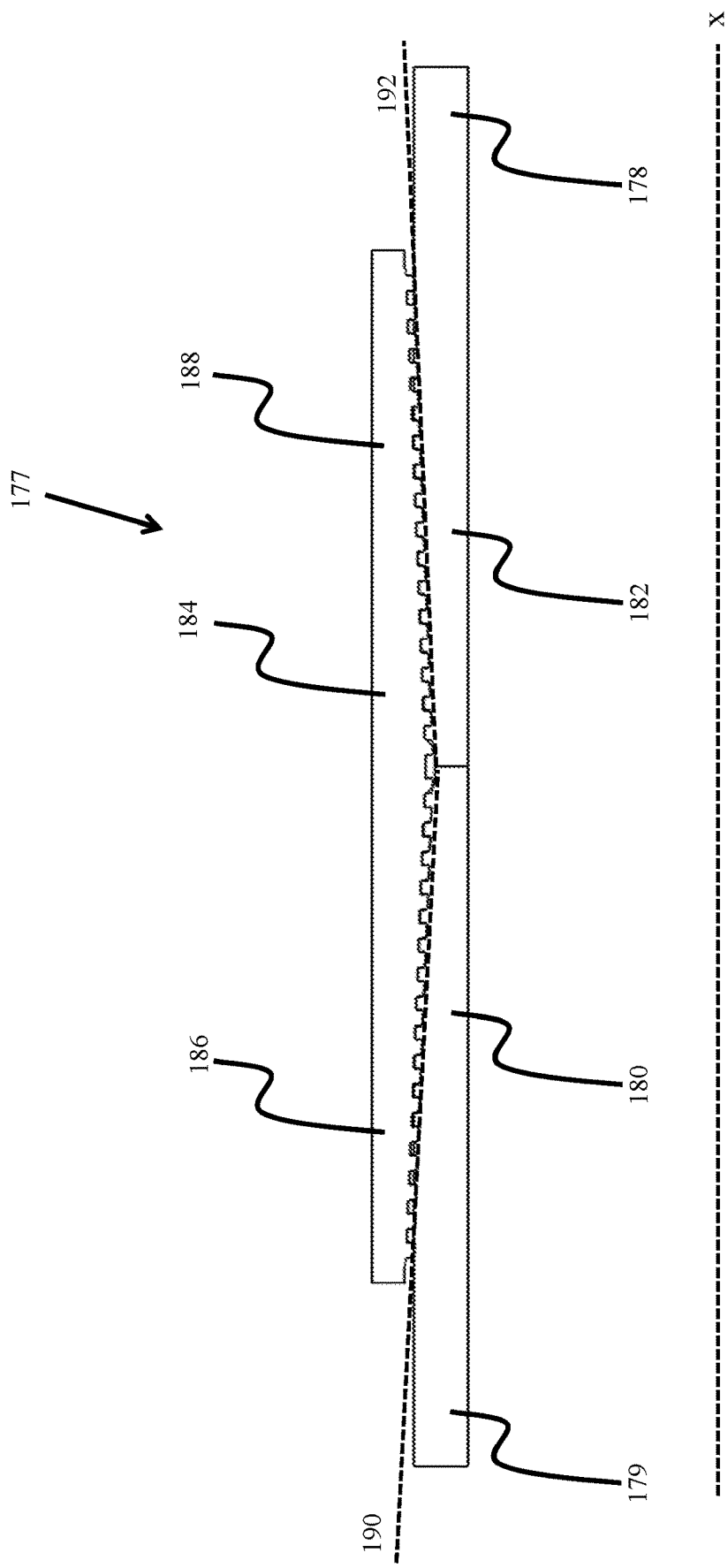
FIG. 8 is a cross-sectional view of a fully made up connection between a coupling, the box, and two pipe ends, the pins without an internal metal-to-metal seal.

Referring now to FIG. 8, a cross-sectional view is shown of a fully made up connection between a coupling, the box, and two pipe ends, the pins without an internal metal-to-metal seal. Connection 177 includes separate pipes 179, 178 with respective pins 180, 182. A coupling 184 includes box end 186 and box end 188. Pin roots on pin 180 and box crests on box end 186 align along taper plane 190 and pin roots on pin 182 and box crests on box end 188 align along taper plane 192. Taper planes 190, 192 are angled at a positive angle relative to the horizontal axis x.

Figure 9:
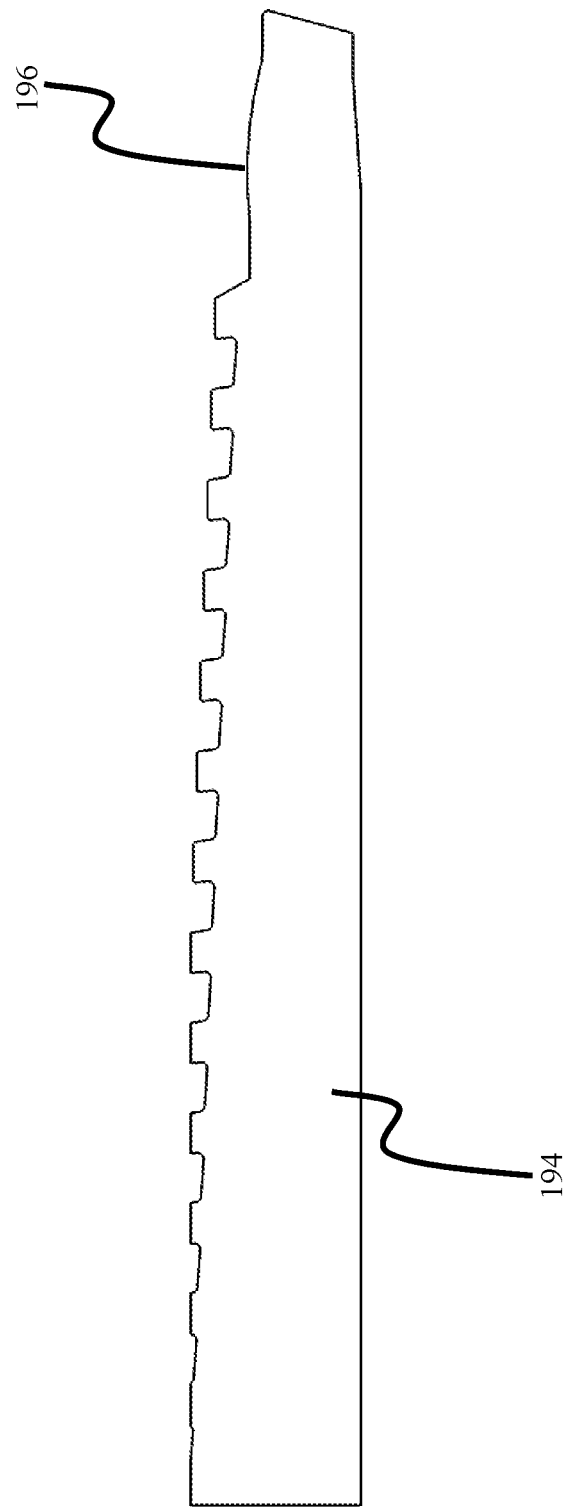
FIG. 9 is a cross-sectional view of a pin thread with an internal metal-to-metal seal.
Figure 10:
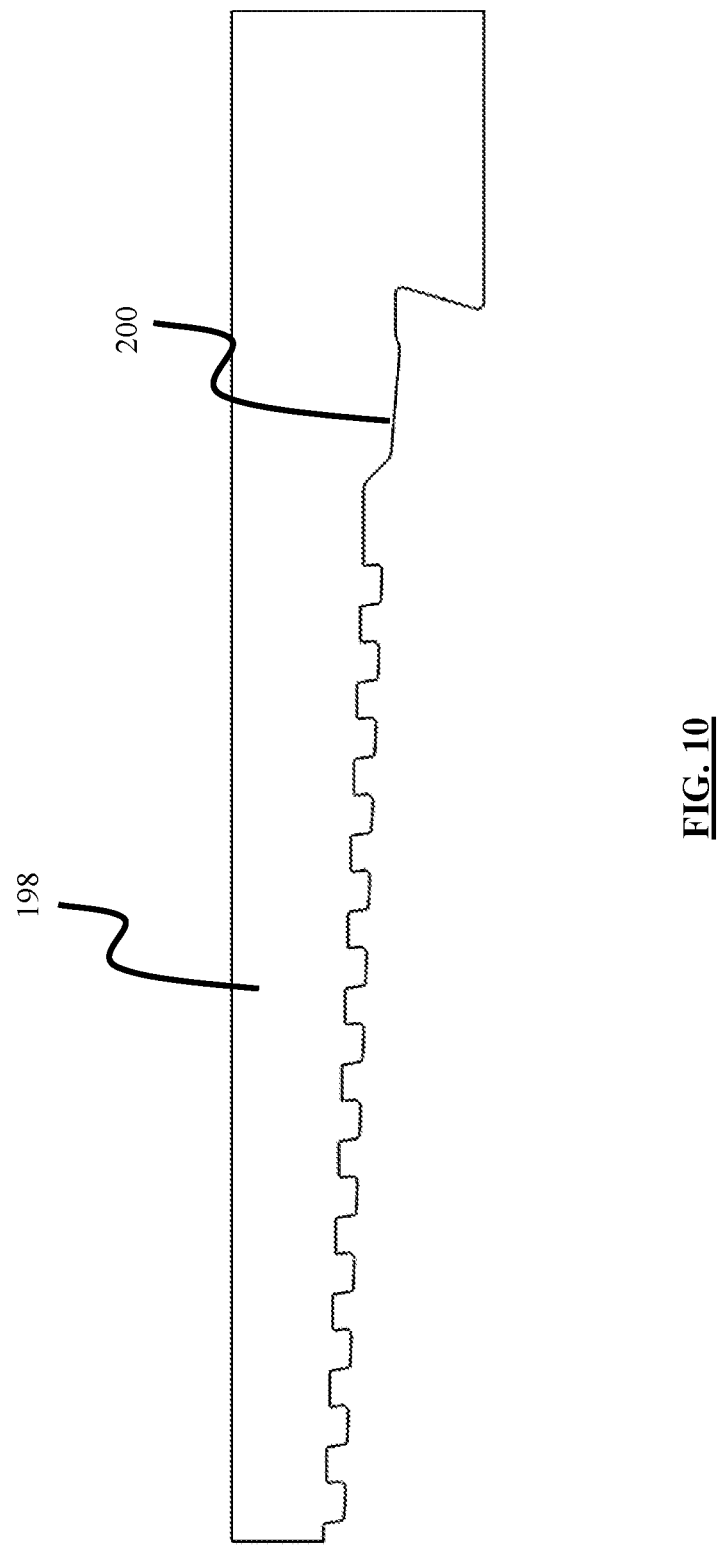
FIG. 10 is a cross-sectional view of a box thread with an internal metal-to-metal seal.
Figure 11:
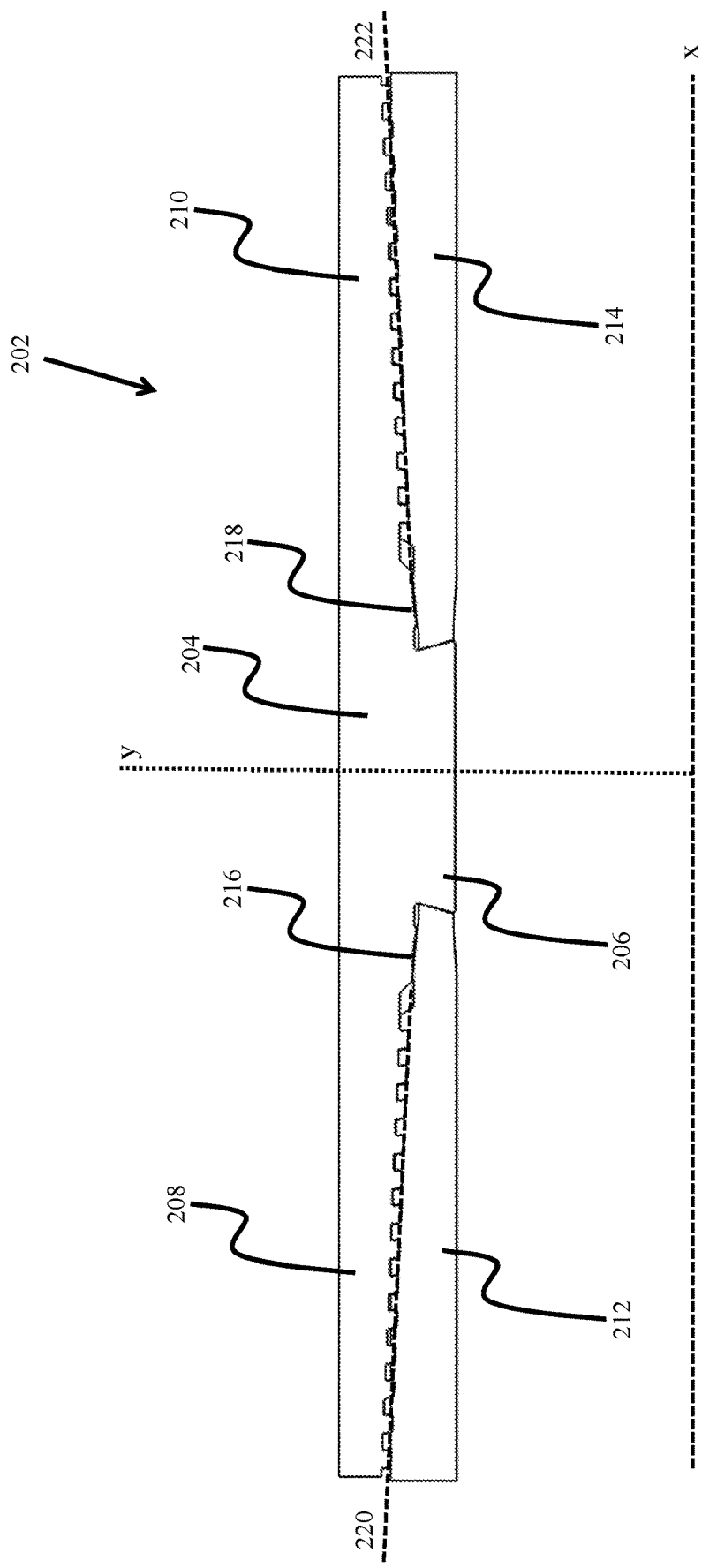
FIG. 11 is a cross-sectional view of a fully made up connection between a coupling, the box, and two pipe ends, the pins with an internal metal-to-metal seal under interference.

Referring now to FIGS. 9-11, FIG. 9 is a cross-sectional view of a pin with an internal metal-to-metal seal. Pin 194 includes an internal metal seal 196. FIG. 10 is a cross-sectional view of a box thread with an internal metal-to-metal seal. Box 198 includes an internal metal seal 200. Internal metal seal 196 on pin 194 can interfere with internal metal seal 200 on box 198 to create an internal metal-to-metal seal, similar to that shown in FIG. 7 at metal-to-metal made up internal seal 172.

FIG. 11 is a cross-sectional view of a fully made up connection between a coupling, the box, and two pipe ends, the pins, with an internal metal-to-metal seal under interference. Connection 202 includes a coupling 204, which itself includes central sealing component 206, box end 208 and box end 210. Pin roots on pin 212 and box crests on box end 208 align along taper plane 220, and pin roots on pin 214 and box crests on box end 210 align along taper plane 222. Taper planes 220, 222 are angled at a radially outward positive angle relative to the horizontal axis x from the central sealing component 206 toward the external ends of the pipe pins and box ends. Metal-to-metal seals 216, 218 are formed by interference between metal seals on pins 212, 214 and box ends 208, 210, for example with internal metal seals such as internal metal seal 196 in FIG. 9 and internal metal seal 200 in FIG. 10.

As explained with respect to FIG. 7, in some embodiments, the angle of the pin roots and box crests along taper planes 220, 222 shown in FIG. 10 will be x°±2° of the box seal angle (x°) of the metal-to-metal seals 216, 218.

Embodiments of the present disclosure include a unique feature in that the pin roots are not parallel to a horizontal axis x. One or more pin root is in a positive angle in reference to the horizontal axis x and is often is often close to the angle of the pin perfect thread taper, but not the same. The unique thread form allows for higher contact pressure to be designed in the connection on makeup due to its ability to save the seal under high compressive loads. Also, the thread form allows for greater surface area of contact between the pin roots and box crests, which increases the torque capacity of the connection, or the torque could stay within the same range as the industry standard but the risk of galling is decreased. If the risk of galling is decreased, then less severe and less costly end finishing can be utilized causing a commercial advantage.

Typical threads with radial interference move in the axial direction while the connection sees extreme compressive loads, and this can cause extra stress on a pin nose, pin nose seal, and box seal. In embodiments of the present disclosure, when the connection moves in the axial direction under high compressive forces, the thread profile will assist in reducing the stress seen in these critical areas. On connections with no metal-to-metal seal, the threads still benefit the connection in the sense that the pin thread root is acting as a negative torque shoulder, deflecting axial compressive forces. This is observed breaking down the contact forces at the pin root into components, and the box crest will attempt to drive itself into the pin root, but the two components acting together in an axial manner cause a wedging effect in the axial direction, which increases interference as the connection tries to move axially with compressive forces.

The unique pin thread form is made up with a unique box thread form to allow proper thread engagement. The box crest geometry also allows the embodiments of the connections to be "stabbed" one additional lead allowing the connection to be made up quicker which saves time.

In an embodiment of a method of designing a threaded connection, first the pin is made with a defined thread taper angle and lead; the box is then designed around the already designed pin. In some embodiments, the pin crest angle is substantially the same angle as the corresponding box internal seal angle. Difficulty exists when making up a connection if box crests have a nearly exact matching shape profile to the pin root, and this is due to certain interference and cross-threading; therefore in certain embodiments a unique geometry exists at the box crest to mitigate the risk of cross-threading, and the unique geometry has allowed the connection to stab one lead deeper allowing for a faster make up.

To begin designing the box thread, the pin geometry outline is first laid in modeling software, such as computer-aided drafting (CAD) software for example, and then drawing around the pin is conducted to make a sufficient box. In some embodiments, the box crest will be 0.002 inches to 0.008 inches below the pin root depending on the size of the connection; a portion of the angle of the box crest is substantially the same angle as the pin root, and this causes interference which increases torque in the connection.

As mentioned, the box crest does not have the same shape or profile as the pin root in some embodiments; therefore a unique geometry is utilized to obtain the above mentioned benefits. Starting at the stab flank and box crest intersection, one design allows the pin root and the box crest to be parallel until about the point of the midpoint of the pin root. At that point, the box thread crest then transitions to be about parallel to a central axis x until intersecting with the load flank. See for example FIG. 4.

Design proceeds back to the intersecting point where the transition occurs from the box crest being parallel to the pin root to being parallel to the central axis and adds a generous radius; this ensures ample clearance between the box crest and the pin root and load flank at the base where the pin root meets the load flank. This also ensures galling resistance. Design also uses the intersecting point of the box load flank and box crest, which is parallel to the central axis and a generous radius is added that is different than the radius designed for the box crest. Generous radius assists with fatigue and reducing stress risers; and this is important in design embodiments since the angle on the load flank and pin root and box crest are at acute angles which cause higher stress concentration factors.

For example referring to FIGS. 2 and 4, a unique radius at intersection point 143 between the box crest 138 and load flank 142 allows for a void or gap between intersection point 143 and intersection point 103 in FIG. 2 between pin root 110 and load flank 116.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

What is claimed is:

1. A threaded connection having a straight central axis, the connection comprising:
    a pin, the pin comprising a plurality of pin threads, each pin thread having a root, a crest, a stab flank, and a load flank, a depth of each pin thread determined by a distance between the root and the crest, and a width of each pin thread determined by a distance between the stab flank and the load flank, wherein stab flank angles of the stab flanks of the pin threads are between about positive 6° and positive 11° relative to a 90° angle and extending toward an external end of the pin, and wherein load flank angles of the load flanks of the pin threads are between negative 3° and negative 7° relative to a 90° angle and extending toward the external end of the pin;
        the roots of adjacent pin threads aligned along a pin root taper plane that is angled radially outwardly relative to the straight central axis of the connection from an internal end of the pin to the external end of the pin; and
        the crests of adjacent pin threads aligned substantially parallel to the straight central axis; and
    a box, the box having a plurality of box threads, each box thread having a root, a crest, a stab flank, and a load flank, a depth of each box thread determined by a distance between the root and the crest, and a width between each box thread determined by a distance between the stab flank and the load flank of adjacent box threads, wherein stab flank angles of the stab flanks of the box threads are between positive 6° and positive 11° relative to a 90° angle and extending toward a center of the box, and wherein load flank angles of the load flanks of the box threads are between about negative 3° and negative 7° relative to a 90° angle and extending toward the center of the box;
        a portion of the crests of adjacent box threads aligned along a box crest taper plane that is angled radially outwardly relative to the straight central axis of the connection from the center of the box to an external end of the box;
        the roots of adjacent box threads aligned substantially parallel to the straight central axis;
    wherein the pin threads and the box threads are arranged such that when the connection is fully made up, the pin roots and box crests come into interference substantially in line with the pin root taper plane and box crest taper plane between the stab flanks of the box crests and midpoints of the box crests without interference between the midpoints of the box crests and the load flanks of the pin threads due to different shape profiles between the pin roots and box crests, and wherein the angles of the pin root taper plane and box crest taper plane allow for reduction of axial compressive forces on the plurality of pin threads and plurality of box threads along the straight central axis, and further reduce compression on at least the load flanks of the connection.

2. The threaded connection according to claim 1, wherein the pin root taper plane and box crest taper plane are angled radially outwardly toward the external end of the pin at about between 1° and about 6° relative to the straight central axis.

3. The threaded connection according to claim 1, wherein the pin root taper plane and box crest taper plane are angled radially outwardly toward the external end of the pin at about 4° relative to the straight central axis.

4. The threaded connection according to claim 1 further comprising a pin internal seal surface and a box internal seal surface, such that when the connection is fully made up an internal metal-to-metal seal comes into interference.

5. The threaded connection according to claim 4, wherein the pin root taper plane and box crest taper plane are angled radially outwardly toward the external end of the pin at about ±2° relative to an angle of the metal-to-metal seal relative to the straight central axis.

6. The threaded connection according to claim 1, wherein upon makeup of the connection, one or more voids suitable for placement of doping exists between at least one location selected from the group consisting of: between the pin crests and box roots; and between the stab flanks.

7. The threaded connection according to claim 1, wherein upon makeup of the connection, voids suitable for placement of doping exist between at least one pin crest and box root, and between at least one pair of the stab flanks.

8. A method for machining a threaded connection having a straight central axis, the method comprising the steps of:
    machining a pin, the pin comprising a plurality of pin threads, each pin thread having a root, a crest, a stab flank, and a load flank, a depth of each pin thread determined by a distance between the root and the crest, and a width of each pin thread determined by a distance between the stab flank and the load flank, wherein stab flank angles of the stab flanks of the pin threads are machined to be between about positive 6° and positive 11° relative to a 90° angle and extending toward an external end of the pin, and wherein load flank angles of the load flanks of the pin threads are machined to be between about negative 3° and negative 7° relative to a 90° angle and extending toward the external end of the pin;
        the roots of adjacent pin threads aligned along a pin root taper plane that is angled radially outwardly relative to the straight central axis of the connection from an internal end of the pin to the external end of the pin; and the crests of adjacent pin threads aligned substantially parallel to the straight central axis; and machining a box, the box having a plurality of box threads, each box thread having a root, a crest, a stab flank, and a load flank, a depth of each box thread determined by a distance between the root and the crest, and a width between each box thread determined by a distance between the stab flank and the load flank of adjacent box threads, wherein stab flank angles of the stab flanks of the box threads are machined to be between about positive 6° and positive 11° relative to a 90° angle and extending toward a center of the box, and wherein load flank angles of the load flanks of the box threads are machined to be between about negative 3° and negative 7° relative to a 90° angle and extending toward the center of the box;

a portion of the crests of adjacent box threads aligned along a box crest taper plane that is angled radially outwardly relative to the straight central axis of the connection from the center of the box to an external end of the box;

the roots of adjacent box threads aligned substantially parallel to the straight central axis;

wherein the pin threads and the box threads are arranged such that when the connection is fully made up, the pin roots and box crests come into interference substantially in line with the pin root taper plane and box crest taper plane between the stab flanks of the box crests and midpoints of the box crests without interference between the midpoints of the box crests and the load flanks of the pin threads due to different shape profiles between the pin roots and box crests, and wherein the angles of the pin root taper plane and box crest taper plane allow for reduction of axial compressive forces on the plurality of pin threads and plurality of box threads along the straight central axis, and further reduce compression on at least the load flanks of the connection.

9. The method according to claim 8, wherein the pin root taper plane and box crest taper plane are machined to be angled radially outwardly toward the external end of the pin at about between 1° and about 6° relative to the straight central axis.

10. The method according to claim 8, wherein the pin root taper plane and box crest taper plane are machined to be angled radially outwardly toward the external end of the pin at about 4° relative to the straight central axis.

11. The method according to claim 8, further comprising a step of machining a pin internal seal surface and a box internal seal surface, such that when the connection is fully made up an internal metal-to-metal seal comes into interference.

12. The method according to claim 11, wherein the pin root taper plane and box crest taper plane are machined to be angled radially outwardly toward the external end of the pin at about ±2° relative to an angle of the metal-to-metal seal relative to the straight central axis.

13. The method according to claim 8, further comprising the step of machining one or more voids suitable for placement of doping between at least one location selected from the group consisting of: between the pin crests and box roots and between the stab flanks.

14. The method according to claim 8, further comprising the step of machining one or more voids suitable for placement of doping between at least one pin crest and box root, and between at least one pair of the stab flanks.

* * * * *